Sept. 16, 1924.
A. F. ERICKSON
HEAT REGULATOR
Filed Sept. 6, 1921
1,508,511
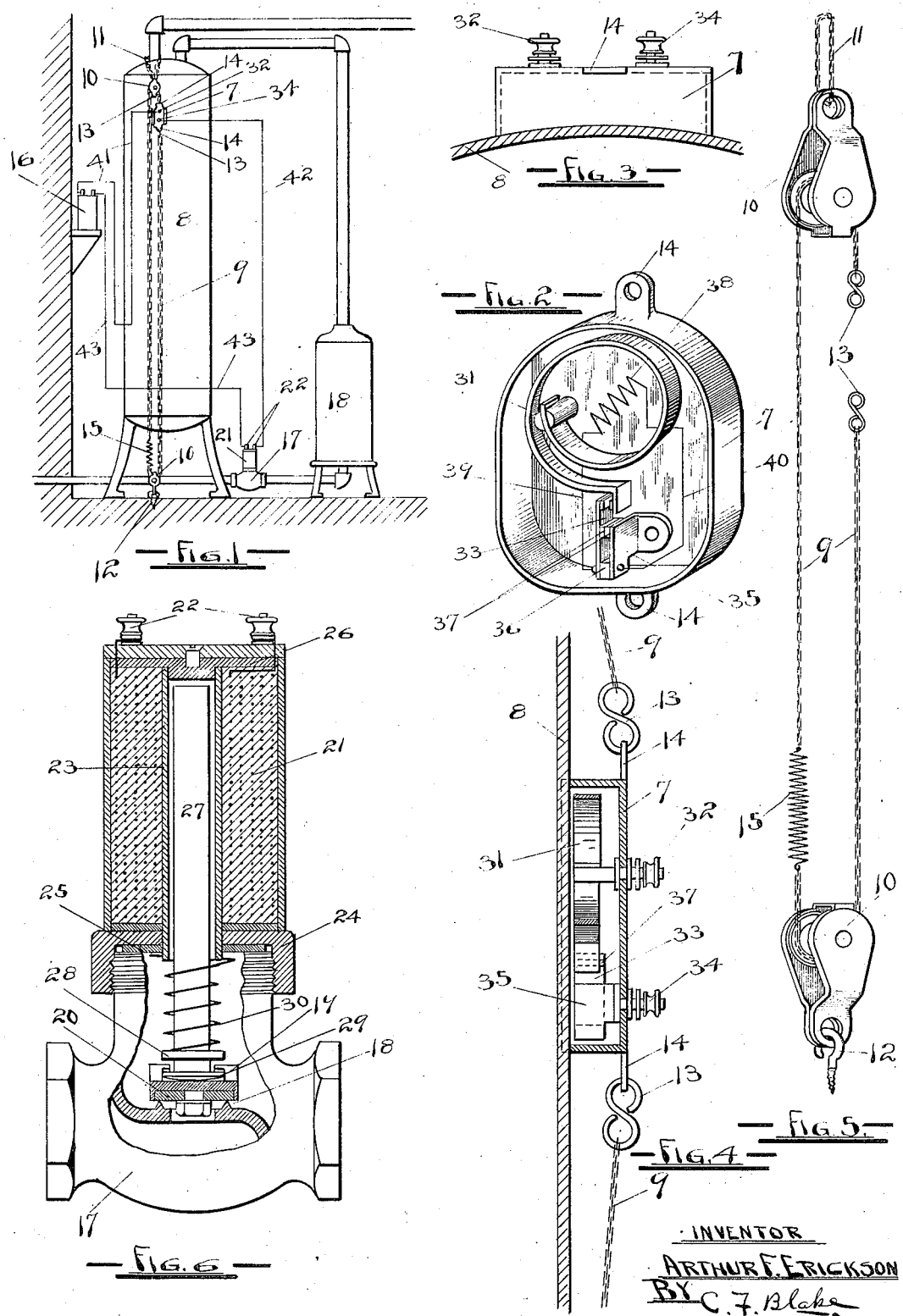
INVENTOR
ARTHUR F. ERICKSON
BY C. F. Blake
ATTY.

Patented Sept. 16, 1924.

1,508,511

UNITED STATES PATENT OFFICE.

ARTHUR F. ERICKSON, OF PORTLAND, OREGON.

HEAT REGULATOR.

Application filed September 6, 1921. Serial No. 498,832.

*To all whom it may concern:*

Be it known that I, ARTHUR F. ERICKSON, a citizen of the United States, residing at Portland, county of Multnomah, State of Oregon, have invented certain new and useful Improvements in Heat Regulators, of which the following is a specification.

My invention relates to heat regulators in general, and particularly to such regulators as are used in connection with gas heaters, being especially adapted in its preferred form to the regulation of gas heated hot water tanks, and is so illustrated in the accompanying drawing.

The object of my invention is to provide a device that may be set so as to allow of any predetermined portion of the volume of water within a hot water tank being heated by a gas heater, and being so heated can be kept hot indefinitely without increase or decrease in the volume of water kept hot, and with the minimum consumption of gas.

I accomplish the above object, and other desirable results by means of the construction illustrated in the accompanying drawing, which is a part of this application for Letters Patent, like characters of reference indicating like parts throughout the several views thereof, and in which:

Fig. 1 is a view of a hot water tank and gas heater with my device installed therewith.

Fig. 2 is a perspective view of the interior of the thermostat.

Fig. 3 is a plan view of the thermostat.

Fig. 4 is a sectional elevation of the thermostat.

Fig. 5 is a detail of the thermostat suspension device.

Fig. 6 is a sectional elevation of the magnetically operated valve.

In general my device consists of an especially constructed and novel thermostat mounted in contact with a hot water tank in a vertically movable manner, and a magnetically operated valve electrically connected in series with said thermostat and a source of electric current, said valve controlling the gas supply to a gas heater.

The thermostat 7 is adapted to contact with the hot water tank 8 and to be mounted by mechanism that permits of the vertical movement of the thermostat upon the tank while being always in contact therewith. As a convenient and suitable means of accomplishing this I suspend the thermostat upon an endless flexible member, such as the chain 9 operating over suitable pulley blocks 10 adjacent each end of the tank 8. The upper pulley block may be suspended from the tank top by a flexible member, such as the chain 11, and the lower pulley block may be secured to the floor by means of a screw eye 12. The thermostat is conveniently connected to said flexible member 9 by suitable eyelet members 13 respectively engaging suitable ears 14 upon the thermostat, and a spring 15 is connected into said flexible member 9 to secure sufficient tension therein to keep the thermostat always in contact with the tank 8.

The thermostat is connected in series with a suitable source of electric current, such as the dry battery 16 and a gas regulating valve 17, which valve 17 controls the gas supply to a gas water heater 18.

Said valve 17 is provided with a vertically disposed knife edged annular seat 18 coacting with a valve member 19 having a washer 20 of yieldable material therein adapted to contact with the seat 18, said washer being preferably of leather. Vertically mounted upon said valve 17 is a solenoid 21 with two electrical binding posts 22 upon the upper end thereof, and with a centrally disposed tube 23 extending therethrough and downward slightly into the top of the valve 17, as shown in Fig. 6. The lower head 24 of said solenoid 21 is adapted to be attached to the valve 17, preferably screwed thereon as shown in Fig. 6, there being a yieldable washer 25 intermediate said head 24 and said valve 17 to provide a gas tight joint therebetween. The upper head 26 of said solenoid 21 has a projection thereon adapted to enter the upper end of the tube 23, and said tube is integrally secured to each of said heads 24 and 26 in any suitable manner, such as soldering or the like. The result of this solid integral connection of the two heads by means of the tube 23 combined with the use of the washer 25 is a perfectly gas tight solenoid, thus providing that should any gas leakage occur within the valve 17 no gas can escape into the atmosphere by way of the solenoid.

The solenoid is provided with a plunger 27 having upon the lower end thereof two collars 28 and 29, each of said collars being integrally formed upon the plunger 27, as shown in Fig. 6 The face of the lower of said collars 29 is rounded and adapted to contact with the upper face of the valve member 19, said collar 29 entering suitable grooves in said valve member, and said grooves being of sufficient size to allow a slight amount of relative movement between the plunger 27 and the valve member 19, so that the latter may find its seat upon the valve seat 18 whether or not the plunger 27 is exacly vertical in position. A spring 30 is disposed intermediate the washer 25 and the collar 28, being adapted to hold the valve member 19 upon its seat 18, the upper end of said spring embracing the lower end of the tube 23 where the latter enters the valve 17 and thus insuring that said spring does not contact with the plunger 27 to cause friction thereupon.

The thermostat is composed of a box like member 7 having ears 14 thereupon by which it is suspended, said member being open upon that face thereof adjacent the hot water tank 8, and curved upon such face to fit said tank, as shown in Fig. 3.

Within said member 7 is mounted a thermostatic member 31 connected to an electric binding post 32 upon the member 7. An electric contact member 33 is provided to coact with the free end of said thermostatic member 31 and electrically connect the latter to an electric binding post 34 by means of a bracket 35. Said contact member 33 is constructed of spring material, and is mounted upon the bracket 35 by means of a suitable insulation member 36, but is electrically in connection with said bracket 35, when said spring contact member 33 is in normal position, by means of the contact pieces 37. The spring member 33 is of sufficient delicacy to allow of its being deflected upon the thermostat member 31 coming into contact therewith, and thus breaking the electric circuit through the contact pieces 37.

A resistance coil 38 is mounted within the thermostat housing 7 and one end of said resistance coil is connected by wire 39 to the spring member 33, and the other end of said resistance coil is connected by wire 40 to the bracket 35.

There is a line of temperature change upon hot water tanks sufficiently pronounced to operate the thermostat, and thus through the valve 17 to operate the heater 18, turning the latter off or on as the varying temperature of the water within the tank determines, and any desired volume of water within the tank may be constantly kept hot by setting the thermostat at that point where the desired volume is represented by that portion of the tank above the thermostat.

In Fig. 1 the thermostat is shown set a short distance below the top of the tank. Let it be supposed that the volume of water within the tank above the thermostat is sufficient to supply the ordinary needs of the household during the day if kept constantly hot. Let it be further supposed that the water within the tank is cooling off. Then the operation of my device is as follows.

When the water has cooled to a temperature sufficient to operate the thermostat, the thermostatic member 31 will contact with the spring member 33, and thus an electric current is established from the battery 16 through wire 41 and binding post 32 to thermostatic member 31, spring member 33, contacts 37, bracket 35 and binding post 34, wire 42, solenoid 21, and wire 43 to the battery. This electric current energizes the solenoid 21 of the valve 17 causing the latter to open, and to stay open as long as said current flows. The opening of the valve 17 starts up the gas heater 18 and thus causes hot water to enter the tank 8. As soon as that water within the tank adjacent the thermostat becomes hot enough to operate the thermostatic member 31 in the opposite direction said member moves away from the spring member 33 and thus brakes the electric current above described at the point of contact therebetween. This deenergizes the solenoid 21 and lets the valve 17 close under the impulse of the spring 30, thus shutting down the heater 18.

When the water becomes cool again the same cycle of operations is repeated, and thus that water within the tank above the thermostat will be kept at substantially constant temperature indefinitely.

Should a demand for a large amount of hot water be anticipated the thermostat is moved downward upon the tank until the volume of water above the thermostat is sufficient to meet the anticipated demand, and then the thermostat automatically operates the valve 17 and thus causes the heater 18 to supply hot water to the tank, and the thermostat holds the valve 17 open until the heater has deposited sufficient hot water within the tank to completely fill that portion of the tank above the thermostat, whereupon the thermostat causes the valve 17 to close, and allows the latter to remain closed until the water begins to cool off, whereupon the thermostat again opens the valve 17 and causes more hot water from the heater to enter the tank.

It is thus seen that the device is entirely automatic, and requires no attention further than placing the thermostat in such a position that that portion of the tank above the thermostat represents the volume of water required be kept hot, or to be quickly heated for some particular purpose.

As above explained my device uses electric current constantly while the water is being heated in order to hold the valve 17 open, and to reduce the current comsumption to a minimum is the function of the resistance coil 38, which operates as follows.

When the thermostatic member 31 contacts with the spring member 33 the electric current is established as above described, but a further movement of the thermostatic member in the same direction deflects the spring member 31 and breaks the circuit at the contact points 37. The current then flows as before, except that it flows from the spring member 33 through wire 39, resistance coil 38 and wire 40 to the bracket 35, the resistance coil cutting down the current to that just sufficient to hold the valve 17 open.

My device may be made of any size, and constructed of any materials deemed convenient and suitable for a device of this character, and while I have illustrated and described a form of construction and arrangement of parts found desirable in materializing my invention, I wish to include in this application for letters patent all mechanical equivalents and substitutes that may fairly be considered to come within the scope and purview of my invention as defined in the appended claims.

Having disclosed my invention so that others may be enabled to construct the same, what I claim as new, and desire to secure by Letters Patent is:

1. A thermostat; mechanism for slidably mounting said thermostat adjacent a hot water tank; an electro-magnetically operated valve controlling the gas supply to a gas water heater; said valve and said thermostat being connected into an electric current circuit.

2. A thermostat adapted to control a water heater; and mechanism for slidably mounting said thermostat adjacent a hot water tank.

3. A hot water tank; a gas operated water heater; thermostatic mechanism for controlling said heater; and mechanism for enabling said thermostatic mechanism to cause said heater to maintain a constant supply of hot water of predetermined volume within said tank.

4. The combination of a hot water tank; a gas water heater; an electro-magnetically operated valve controlling the gas supply of said heater; a thermostat controling the electric operation of said valve; and means of mounting said thermostat in a slidable manner upon said tank.

5. A hot water tank; a gas water heater; and mechanism for controlling said heater so as to cause the latter to maintain a predetermined volume of water at a constant temperature within said tank.

In witness whereof I claim the foregoing as my own I hereunto affix my signature in the presence of two witnesses at Portland, county of Multnomah, State of Oregon, this 30th day of Aug., 1921.

ARTHUR F. ERICKSON.

Witnesses:
C. F. BLAKE,
L. J. ROBINSON.